No. 646,895. Patented Apr. 3, 1900.
J. G. DEADERICK.
NUT LOCK.
(Application filed Jan. 24, 1900.)
(No Model.)
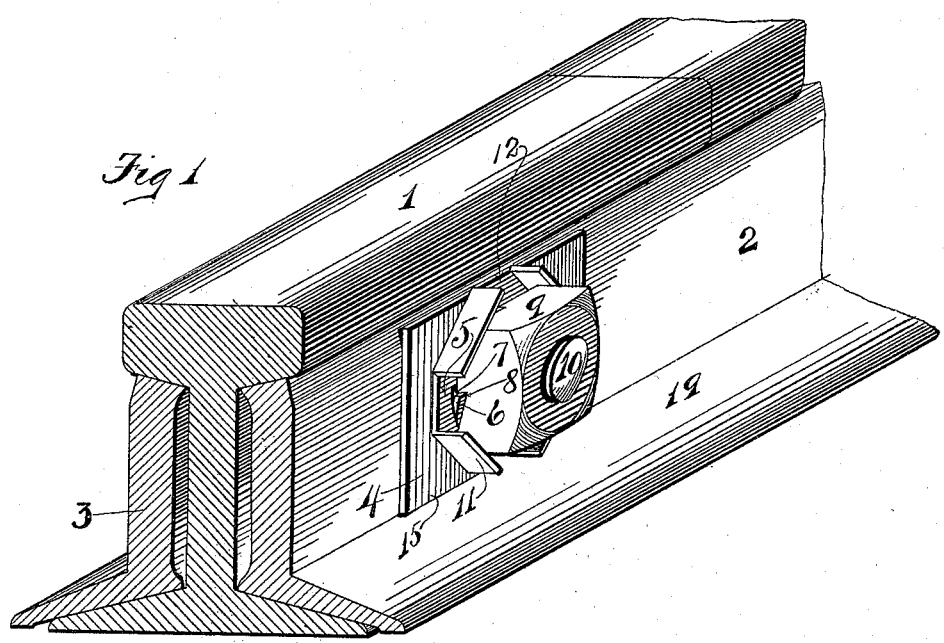
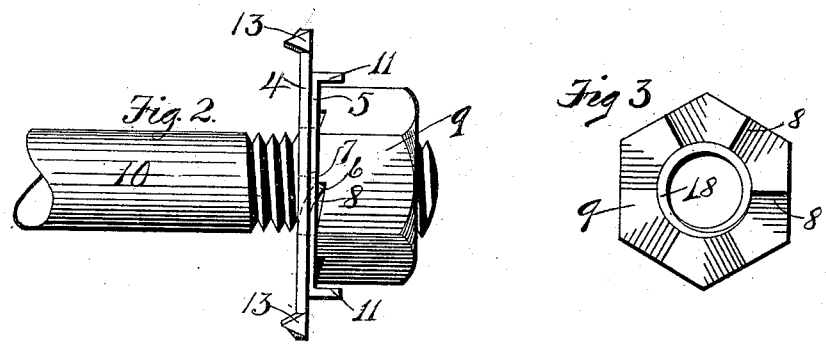
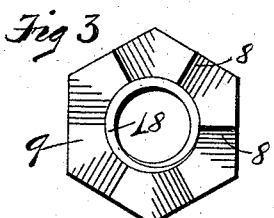
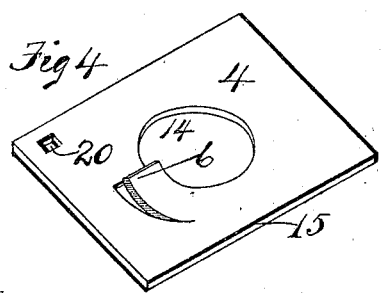
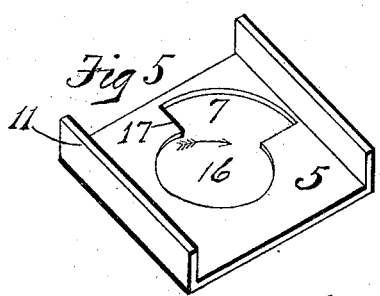
Witnesses.
C. W. Heiskell
J. A. Ward
Inventor.
John Garland Deaderick,
by J. H. Weatherford
his atty.
THE NORRIS PETERS CO., PHOTO-LITHO., WASHINGTON, D. C.

UNITED STATES PATENT OFFICE.

JOHN GARLAND DEADERICK, OF MEMPHIS, TENNESSEE.

NUT-LOCK.

SPECIFICATION forming part of Letters Patent No. 646,895, dated April 3, 1900.

Application filed January 24, 1900. Serial No. 2,644. (No model.)

*To all whom it may concern:*

Be it known that I, JOHN GARLAND DEADERICK, a citizen of the United States, residing at Memphis, Shelby county, State of Tennessee, have invented certain new and useful Improvements in Nut-Locks, of which the following is a specification.

My invention relates to nut-locks, and particularly to that class of locks in which it may be desired to remove the nut at some subsequent time; and it has for its object to provide a simple, cheap, and effective device which will positively lock the nut against accidental loosening or removal and yet will permit its removal when it is so desired. I accomplish this object by the novel construction and combination of parts hereinafter set forth in this specification, drawings, and claims.

In railroad-work the joint between the two rails is made by using a pair of angle-bars 2 3, one on each side of the rail, held together by bolts passing through the rail and angle-bars. These joints vibrate so constantly under passing trains that the nut soon jars loose, resulting in excessive wear to the rail ends, and, finally, if great care is not taken, in probable disaster. Since this same result occurs, too, in nearly every place and condition under which bolts and nuts are used, the question becomes one of vital importance to provide efficient means of keeping the nuts tight. In order to hold these nuts in place, many devices have been made and tried, but the majority of these, even if otherwise successful, are faulty in not allowing removal of the nut when it is desired. In my invention I have obviated this by providing a means of easily removing the nut whenever it may be necessary or desirable.

In the drawings, Figure 1 is a perspective drawing of a nut-lock involving all the essential features of my invention as applied to railroad-work. Fig. 2 is a side elevation of a bolt and nut and locking and unlocking washers as designed for use on wood. Fig. 3 is an inverted plan of the nut. Fig. 4 shows a perspective view of the locking, and Fig. 5 is a like view of the unlocking, washer.

Referring now to the drawings, in which the same numerals indicate the same or like parts in all the views, 1 is the end of an ordinary T-rail for railroads, which rail is joined to the next rail by means of a pair of angle-bars 2 3. These angle-bars 2 3 are held together by bolts 10, passing through holes therein and holes in the web of the rail, which holes are punched to register with each other. The bolt 10 having been put in place through the angle-bars and rail, a locking-plate 4 and an unlocking-plate 5 are slipped on the end of the plate and the nut 9 screwed to its seat. The locking-plate 4 is a washer-plate of thin spring metal, having a hole 14 therein to permit the passage of the bolt and having a spring-tongue 6 struck up on one side to engage cuts in the under side of the nut 9. This tongue 6 extends from the central hole 14 outward toward the edge of the plate; but the said plate is large enough to permit the striking up of the said tongue without cutting through to the edge of the plate, thus leaving a surrounding integral plate to prevent distortion under pressure. A straight side 15 rests against the base 19 of the angle-plate 2 and prevents the locking-plate from turning. The unlocking-plate 5, Fig. 5, has a central hole 16, corresponding to the hole 14, and an opening 7, corresponding to the spring-tongue 6 of the locking-plate 4. This unlocking-plate 5, which may be made of untempered metal, if so desired, is preferably made slightly smaller than the locking-plate to permit of its being turned thereon and has its ends or sides 11 turned up to permit the use of a wrench or other means for turning the plate when it is desired to release the nut. In railroad usage the space between the bottom of the ball of the rail 1 and the flange 19 of the angle-bar 2 is necessarily limited, and an unlocking-washer 5 having only two of its ends, as 11, turned up could not be easily handled. I therefore for such and similar cases turn up the unlocking-washer 5 not only at the ends, but at the sides, as shown in Fig. 1, and in such case it is also necessary to cut away the corners 12 to permit the unlocking-washer to be turned around the bolt 10.

When the parts are assembled, the tongue 6 of the locking-plate 4 extends through the opening 7, cut in the unlocking-washer 5, and when the nut 9 seats the tongue 6 engages with the notches 8, cut in the bottom of the nuts.

In Fig. 2 I illustrate a form of locking-plate 4 for use with woodwork. In this view, 13 are points or corners turned down, which corners sink into the wood to prevent the plate 4 from turning. This view also shows the size of the unlocking-plate 5 with reference to the locking-plate 4 and the nut 9. It also shows the tongue 6, projecting through the opening 7, cut in the unlocking-plate 5 and engaging the notches 8, cut in the bottom of the nut 9. In Fig. 3, 18 shows the thread in the nut.

To use the lock, the locking-plate 4 is first slipped on the bolt, with the spring-tongue 6 turned toward the end of the bolt. The unlocking-plate 5 is next put on the bolt against the locking-plate 4 and in such position that the opening 7 comes over the tongue 6 and allows the same to project through. When now the nut 9 is screwed up, the plates 4 and 5 remain stationary, and the tongue 6 catches the notches 8 around the under side of the nut 9 in succession as the nut is turned, effectually preventing the nut from loosening as long as it is left undisturbed.

To loosen and remove the nut, the unlocking-plate 5 is turned in the direction of the arrow shown in Fig. 5, which is the direction the nut is turned, with a right-hand thread, to tighten it, and the edge 17 of the unlocking-washer depresses the tongue 6 of the locking-plate until it removes it from the notch 8 in the nut 9 and leaves the nut free to be unscrewed.

While I have described in this specification only two means of preventing the locking-plate from turning—i. e., the straight side 15 and the points 13—it is of course evident that any well-known means may be used for this purpose, such as a hole 20, which fits over a projection on one of the plates to be fastened, no claim being made for this particular feature of the lock. It is also to be understood that I do not confine myself to the use of one tongue 6, struck up from the locking-plate, but that two or more may be used without departing from the spirit of my invention, and, further, though I have shown only rectangular plates in this specification and drawings, it is evident that the exact shape of same is not to be considered, such departures from the strict details being well within the scope of this patent.

Having thus fully described my invention, what I claim, and desire to secure by Letters Patent of the United States, is—

1. As a nut-lock, the combination with a bolt, and a nut having a notched or serrated under side; of a locking-plate of spring metal, having a tongue struck up from it to engage with the serrations on the nut, means to prevent the turning of the said plate, and an unlocking-plate disposed between the said locking-plate and the nut, said unlocking-plate having a portion cut away to allow the tongue of the locking-plate to pass through and engage the nut when the plates register, but adapted to depress the tongue when the unlocking-plate is rotated out of register, substantially as shown and described.

2. As a nut-lock, the combination with a bolt, and a serrated or notched nut thereon, of a locking-plate, and an unlocking-plate between the locking-plate and the nut, the said locking-plate having means to prevent its turning and a tongue struck up from it, adapted to pass through the unlocking-plate and engage the serrations on the nut when the plates register, and to be depressed out of engagement with the nut when the unlocking-plate is rotated out of register; the said unlocking-plate having a portion cut away to permit the passage of the tongue when the plates register and projecting ears to furnish means of rotating the unlocking-plate out of register to depress the tongue, and permit the removal of the nut, substantially as shown and described.

3. As a nut-lock, the combination with a bolt, and a nut having notches or serrations on its under side; of an integral plate of resilient metal having a tongue struck up out of the plate but leaving same integral, said plate also having means of preventing its turning, and an integral unlocking-plate disposed between the nut and the locking-plate, having an opening cut out at one side of the bolt-hole to register with and permit the passage of the tongue, and ears turned up by means of which the unlocking-plate may be rotated out of register with the locking-plate to depress the tongue and permit the removal of the nut substantially as described.

In testimony whereof I have signed my name to this specification in the presence of two subscribing witnesses.

JOHN GARLAND DEADERICK.

Witnesses:
JOHN O. SIMS,
JOHN M. EDGERLEY.